United States Patent [19]

Papanier et al.

[11] Patent Number: 5,581,744
[45] Date of Patent: Dec. 3, 1996

[54] METHOD AND APPARATUS FOR CORRECTING POLARITY USING A SYNCHRONIZING SEQUENCE

[75] Inventors: Jordon P. Papanier, San Pedro; Ignacio M. Goyret, Torrance; Andrew Frank, Woodland Hills; Don Jaeger, Los Angeles, all of Calif.

[73] Assignee: Andrew Corporation, Orland Park, Ill.

[21] Appl. No.: 158,697

[22] Filed: Nov. 29, 1993

[51] Int. Cl.⁶ .................................................... G06F 1/00
[52] U.S. Cl. ..................... 395/551; 395/DIG. 1; 395/271; 395/271.9
[58] Field of Search .............................................. 395/550

[56] References Cited

U.S. PATENT DOCUMENTS

| | | | |
|---|---|---|---|
| 4,434,324 | 2/1984 | Boggio et al. | 178/69 R |
| 4,575,864 | 3/1986 | Rice et al. | 375/116 |

FOREIGN PATENT DOCUMENTS

| | | |
|---|---|---|
| 0258621A2 | 3/1988 | European Pat. Off. . |
| 60-214136A | 10/1985 | Japan . |

OTHER PUBLICATIONS

Hub supported GALCOM 5250 stand alone products (brochure) (pp. 8–10).
ADACOM 3270 Communications–AS2299 Active Star Repeater (single page).
MUX Lab–Twinstar III Pin Configuration Jumpers–Dated Nov. 24, 1992 (single page).
CSP Inc.–SMARTStar AS400/3x Active Repeater (brochure) (two pages).
TIEX–Daisy*Powerpanel Plus (single page).
Network Devices Inc.–Gemini Series, Gemini–2000 (single page).

*Primary Examiner*—Kevin A. Kriess
*Attorney, Agent, or Firm*—Arnold, White & Durkee

[57] ABSTRACT

A method and apparatus for improving communication capability between computer devices and peripherals scans a data signal for a valid synchronizing sequence. If no valid synchronizing sequence is detected within a predetermined amount of time, the polarity of the data signal is inverted. Polarity of the data signal is latched when a valid synchronizing sequence is detected. In another aspect of the invention, a header block that receives a connector also includes a first wire bus and a second wire bus. Jumpers are employed to connect the first pin of the connector to the first wire bus and the second pin of the connector to the second wire bus.

9 Claims, 5 Drawing Sheets

METHOD AND APPARATUS FOR CORRECTING POLARITY USING A SYNCHRONIZING SEQUENCE

BACKGROUND OF THE INVENTION

1. Field of the Invention

The present invention relates to computer environment cabling systems, and particularly to an improved connector system which automatically corrects for polarity in two-wire communication systems and provides compatibility regardless of the connector pin configuration standard utilized.

2. Background

Computer environments typically employ coaxial and/or twinax cables to interconnect computer equipment such as host/controller computers to various peripherals such as terminals, printers, etc. However, since coaxial and twinax cables are high-cost cables, alternative wiring systems employing more cost-effective cables, such as Unshielded Twisted Pair ("UTP") cables, have been developed.

Briefly, a UTP cable, connecting a computer host port to a peripheral device, is made up of a two-wire pair consisting of a "tip" wire and a "ring" wire, also referred to as Phase A and Phase B wires. To establish proper communication between the computer host port and a peripheral device, the tip and ring wires at the host port side must respectively connect to the tip and ring pins of the associated peripheral device. If the tip and ring wires are reversed along the wiring path, the data link between computer and device is broken and peripheral devices will not respond to the computer commands. Reversal of the tip and ring wires may result from numerous causes. For example, inversion of the tip and ring wires may occur when cable is routed through patch panels, balun connectors or punch down blocks (such as 110-blocks or 66-blocks). These devices are used to interconnect multiple wires or cable runs with other wires or cable runs. Such communication problems result from the inability of computers and peripherals to recognize inverted data messages. Presently, if such problems arise, the tip and ring wires of the UTP cables must be traced all the way from the computer to the device in order to find where the inversion point is and correct it. While there are special "polarity detector" products that can be purchased to test and indicate the wiring polarity of a given cable to the user, the use of such products is often a time consuming process because cabling systems can interconnect a large number of devices over distances of 6,000 feet or more.

Establishing the proper connection between devices is additionally confounded by the existence of a number of connector pin configuration standards. Generally, connecting two devices requires the installation of telephone-type connectors at both ends of a connecting cable. These connectors have varying numbers of pins. For example, an RJ45 connector can accept up to eight single wires and an RJ11 connector can accept up to six single wires. Various connector pin configuration standards, for example, USOC, AT&T, Ethernet and IBM/Rohn, exist for connectors and these standards may designate different pins as the tip and ring pins. As a result, a communication breakdown occurs if a device using one configuration standard is linked directly to a device using a noncompatible standard because each device would be expecting signal transmission through different pins of the connectors. Furthermore, even if both devices utilize the same pins, a polarity problem will result if one device designates one pin as the tip while the other device designates the same pin as the ring.

SUMMARY OF THE INVENTION

The present invention is an improved connector system for computer environments. The invention includes a method and apparatus for providing automatic polarity correction if signal carrying wires connecting computer devices become reversed over a long cable run. A data signal is scanned to determine the occurrence of a valid synchronizing sequence. If no valid synchronizing sequence is detected within a predetermined amount of time, the polarity of the data signal is inverted. Polarity of the data signal is latched when a valid synchronizing sequence is detected.

In another aspect of the invention, communication problems arising because of the use of different connector pin configurations associated with different communications standards is solved. A header block that receives a connector also includes a tip wire bus and a ring wire bus. Jumpers are employed to connect the tip pin of the connector to the tip wire bus and the ring pin of the connector to the ring wire bus.

DESCRIPTION OF THE PREFERRED EMBODIMENTS

Figure 1:
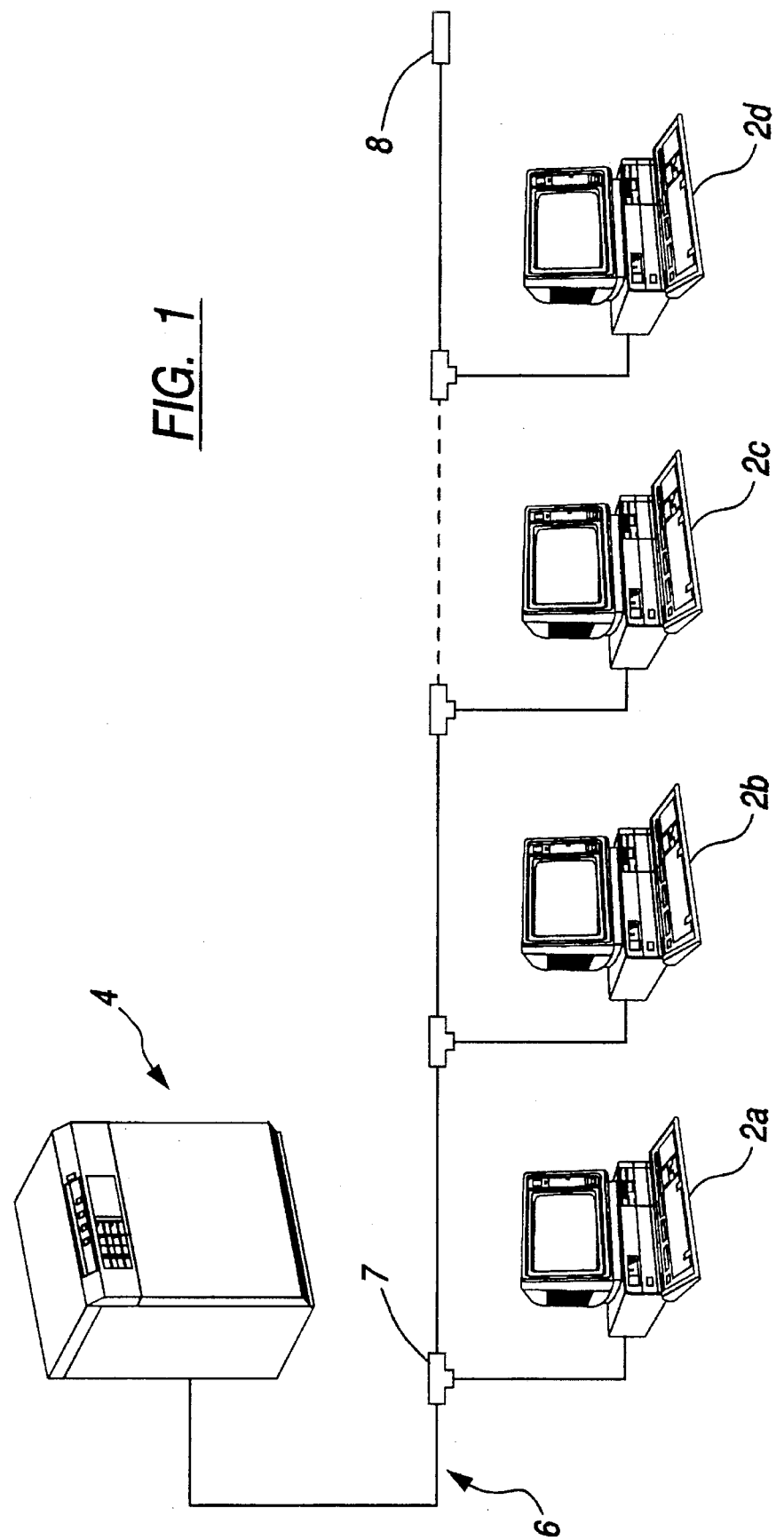
FIG. 1 is a simplified block diagram showing a computer environment having a plurality of computer devices.

The present invention is an improved connector system for computer environments employing a computer with a plurality of peripherals. One such environment is shown in FIG. 1 in which a plurality of computer devices 2a–2d are connected to a computer 4 via a twinax cable 6 and T-connectors 7. A line terminator 8 is connected to the end of the cable 6. In an effort to reduce costs, alternative wiring systems may employ Unshielded Twisted Pair ("UTP") cables in place of the twinax cable 6. UTP cables have a two-wire pair comprising a "tip" wire and a "ring" wire. To establish proper communication between the computer host port and a peripheral device, the tip and ring wires at the host port side have to respectively connect to the tip and ring pins at the connector of an associated device. If somewhere along the wiring path the two wires are reversed, the data link between computer and device is broken and devices will not respond to the commands of the computer.

The present invention automatically corrects for the polarity between two or more devices to rectify communication problems associated with reversed polarity. As a result, the present invention makes the issue of wiring polarity transparent to the user.

Figure 2:
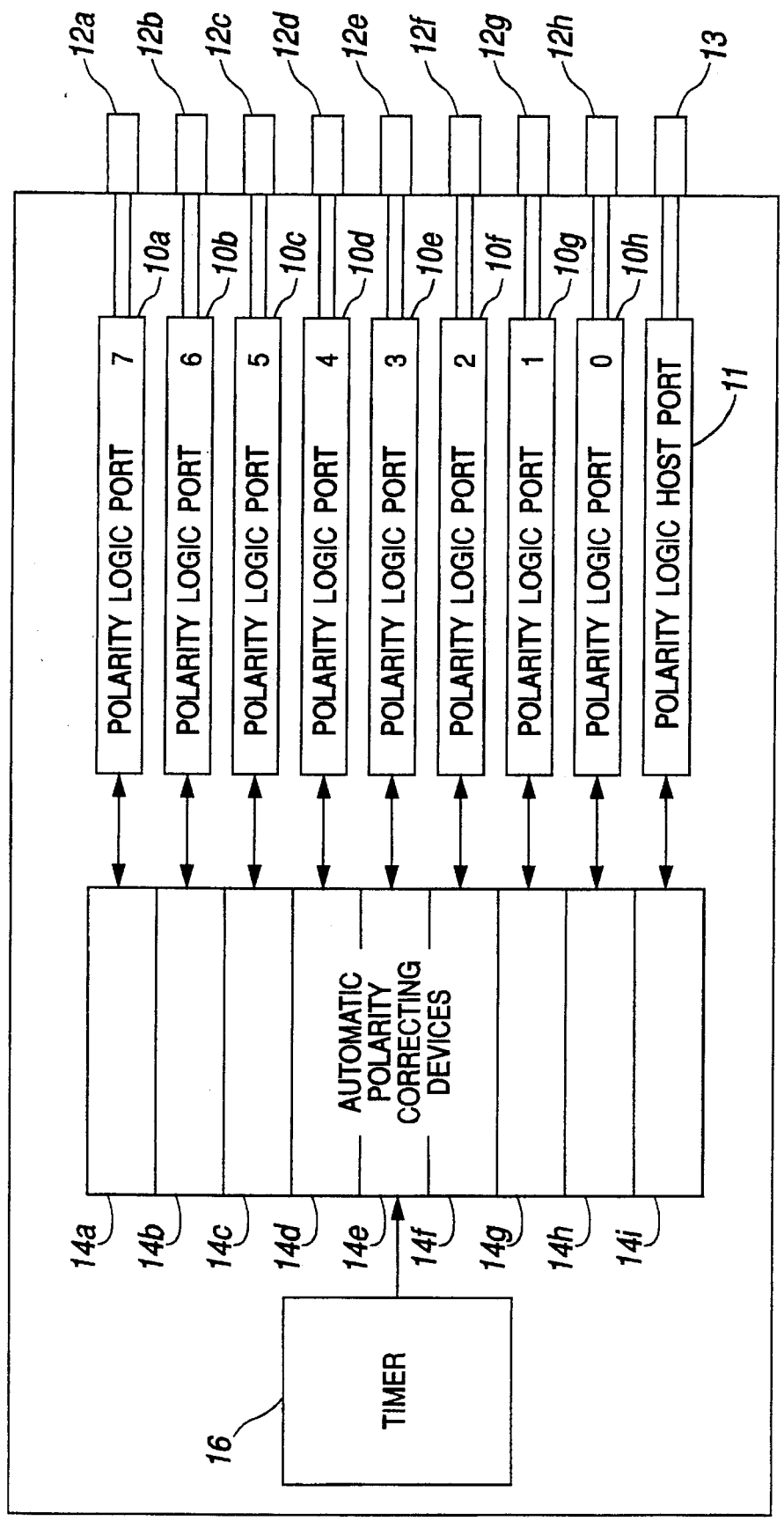
FIG. 2 is a block diagram of a networking hub employing automatic polarity correction devices of the present invention.

The present invention employs automatic polarity detection and correction circuitry for the computer host port and for each of the eight device ports. FIG. 2 is a general block diagram of a networking hub 9 employing the present invention. The networking hub 9 has a plurality of logic ports 10a–10h for a plurality of peripherals and a host logic port 11 for a host computer. The logic ports 10a–10h are connected to ports 12a–12h of various peripheral devices while the host logic port 11 is connected to a port 13 of a host computer. The logic ports 10a–10h and the host logic port 11 are connected to automatic polarity correcting devices 14a–14i. A timer 16 is associated with the polarity correcting devices 14a–14i.

Figure 3:
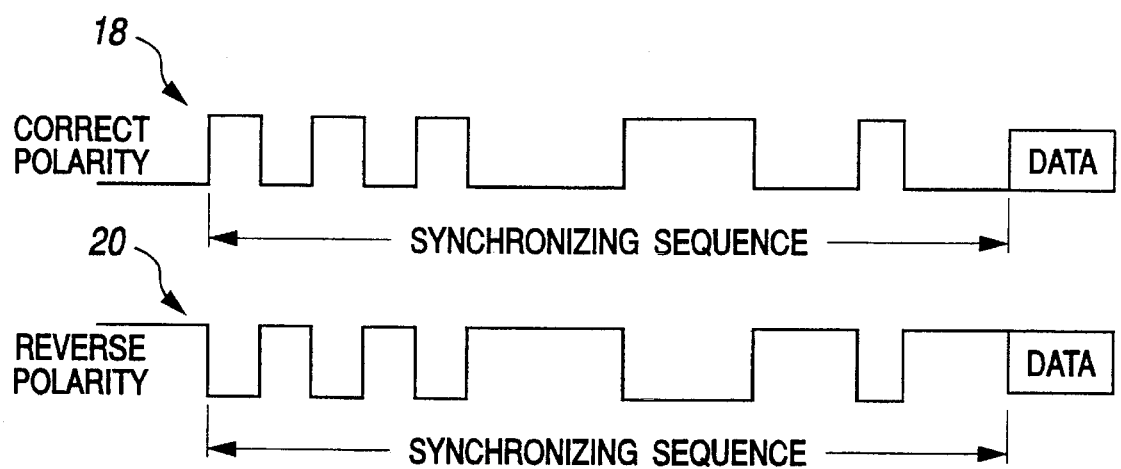
FIG. 3 is an example of a synchronizing command containing a synchronizing sequence component and the inverse of the same.

The invented automatic polarity correcting method is based on the utilization of a communication protocol which guarantees the periodic issuance of a synchronizing command containing a synchronizing sequence component. FIG. 3 depicts an example of such a valid synchronizing sequence 18 as well as an inverted synchronizing sequence 20.

Figure 4:
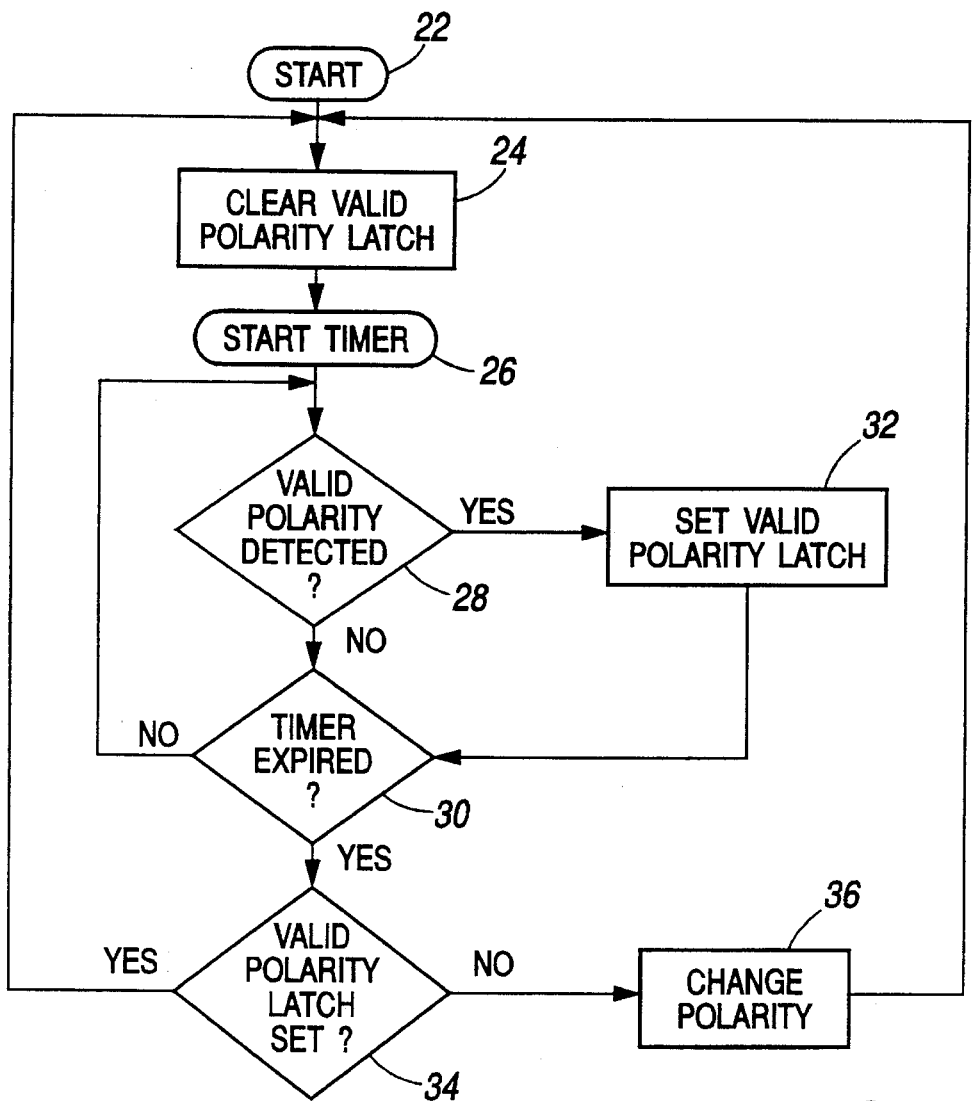
FIG. 4 is a flowchart of a method for automatically correcting polarity according to the present invention.

A flowchart of a method for automatically correcting polarity of a data signal according to the present invention is depicted by FIG. 4. When automatic polarity correction is initiated at step 22, a valid polarity latch is cleared at step 24 and a timer is started at step 26. Next, a data signal, the polarity of which is to be subject to automatic correction, is tested to determine whether it represents a valid synchronizing sequence at step 28. If a valid synchronizing sequence is not detected, the timer is evaluated to determine whether it has expired at step 30. If a valid synchronizing sequence is detected at step 28, the valid polarity latch is set at step 32 before determining whether the timer has expired at step 30. If the timer has not expired at step 30, the signal is tested again to determine whether a valid synchronizing sequence is detected at step 28. After the timer has expired, it is determined whether a valid polarity signal has been detected at step 34 by testing whether the valid polarity latch has been set. If a valid polarity signal has been detected, the process begins again by clearing the valid polarity latch at step 24. If a valid polarity signal has not been detected, the polarity of the signal is reversed at step 36 before the process begins again.

As an example of the invention, when an IBM AS/400 communication protocol is used, an AS/400 host port will issue synchronizing commands to peripheral devices at least every eight seconds. Under this protocol, the timer may be set to ten seconds. As a result, the polarity of the signal will be inverted at step 36 if a valid synchronizing command is not received during a given ten second cycle. The process then begins again with the clearing of the valid polarity latch at step 24. As will be appreciated by those of ordinary skill in the art, the timing described above ensures that valid signals will be detected if present.

Figure 5:
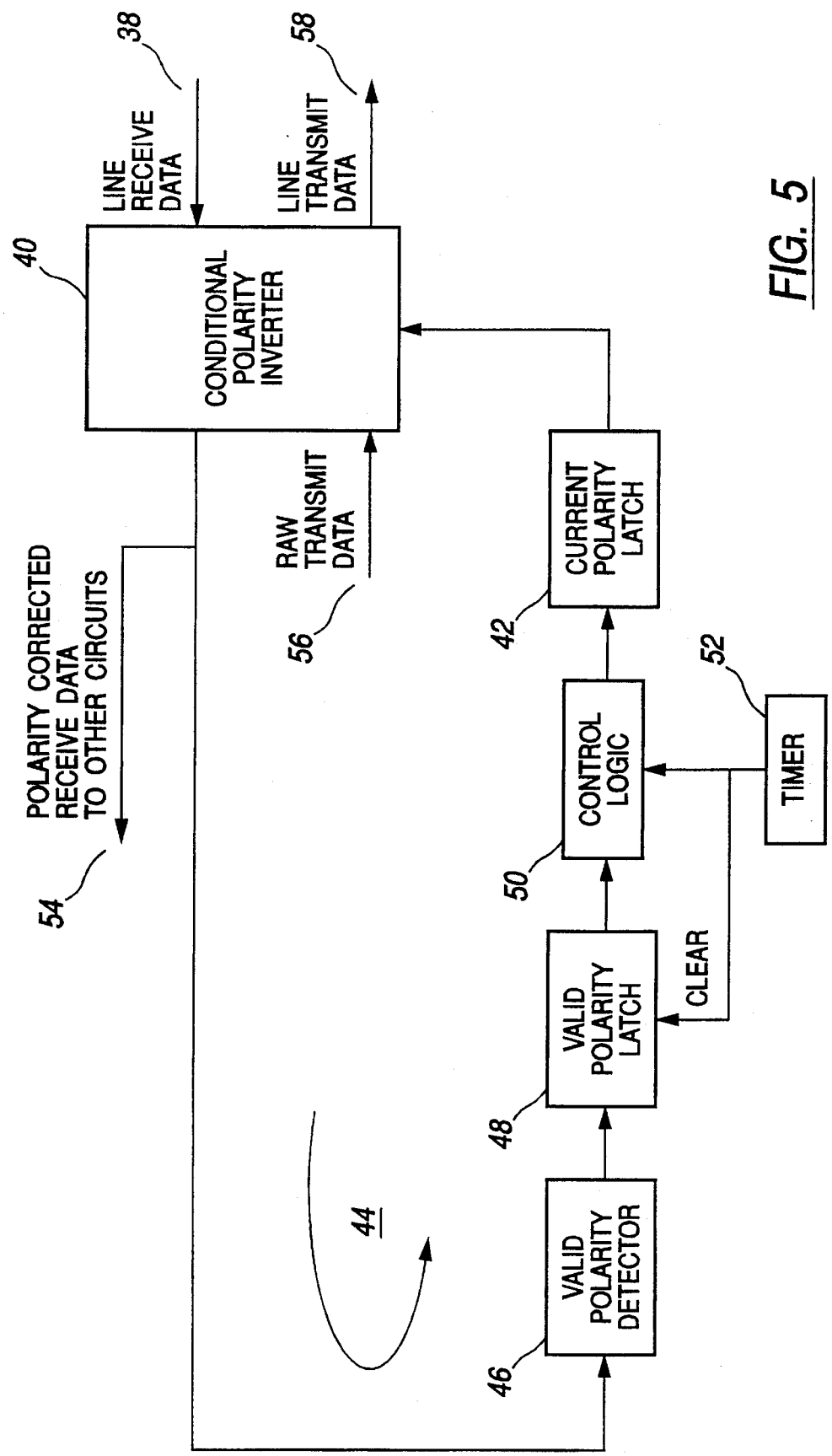
FIG. 5 is a block diagram of an automatic polarity correction device according to the present invention.

FIG. 5 depicts a block diagram of an automatic polarity correction device according to the present invention. A data signal from a sending computer device is transmitted over a cable 38 and received at a conditional polarity inverter 40. Signals passing through the conditional polarity inverter 40 are conditionally inverted depending on the state of the current polarity latch 42. To determine whether a signal being received from the cable 38 has a proper polarity and if necessary to reverse the signal's polarity, the signal is routed through loop 44.

A valid polarity detector 46 tests the signal to determine whether a valid synchronizing sequence signal is present. Upon detection of a valid synchronizing sequence, a valid polarity latch 48 is set high. The valid polarity latch 48 and a control logic circuit 50 are responsive to a timer 52. The construction of the control logic circuit 50 is within the ability of those of ordinary skill in the field based on the description contained herein.

The timer 52 is designed to clear the valid polarity latch 48 periodically based upon the synchronization frequency for the communication protocol being utilized. When the timer 52 is set, the valid polarity latch 48 is cleared. When the timer 52 expires, the control logic circuit 50 determines whether the valid polarity latch 48 has been set. If the valid polarity latch 48 has been set, the control logic circuit 50 does nothing and the timer 52 is reset. However, if the valid polarity latch 48 has not been set, the control logic circuit 50 changes the state of the current polarity latch 42. The timer 52 is then reset and the valid polarity latch 48 is accordingly cleared.

A change in state of the current polarity latch 42 causes the function performed by the conditional polarity inverter 40 to change. That is, if the conditional polarity inverter 40 had been set to not invert signals, it becomes set to invert the polarity of signals, and vice versa. As a result, the data signal sent from the sending computer device via cable 38 is received by a receiving computer device via a line 54 with the proper polarity. To ensure the proper polarity of data signals sent by the receiving computer device back to the sending computer device, these return signals likewise pass through the conditional polarity inverter 40 via line 56 and cable 58. As a result, if the connection between the sending computer device and the receiving computer device is such that the polarity is properly matched, neither the signal received nor the signal sent back is inverted. Conversely, if there is a polarity mismatch, both the signal received and the signal sent back will be inverted.

When a connection is made between two computer devices, a communication problem can result not only from a mismatch in polarity but also a mismatch in connector pin configurations. An invented interface device enables computer devices using different connector pin configuration standards to communicate with each other. The invented interface device is connected between a cable connector and a computer device's port and provides compatibility by permitting a user to designate which of a plurality of pins of a connector are active pins and to additionally designate which of the active pins is connected to the tip wire and which of the active pins is connected to the ring wire.

Figure 6:
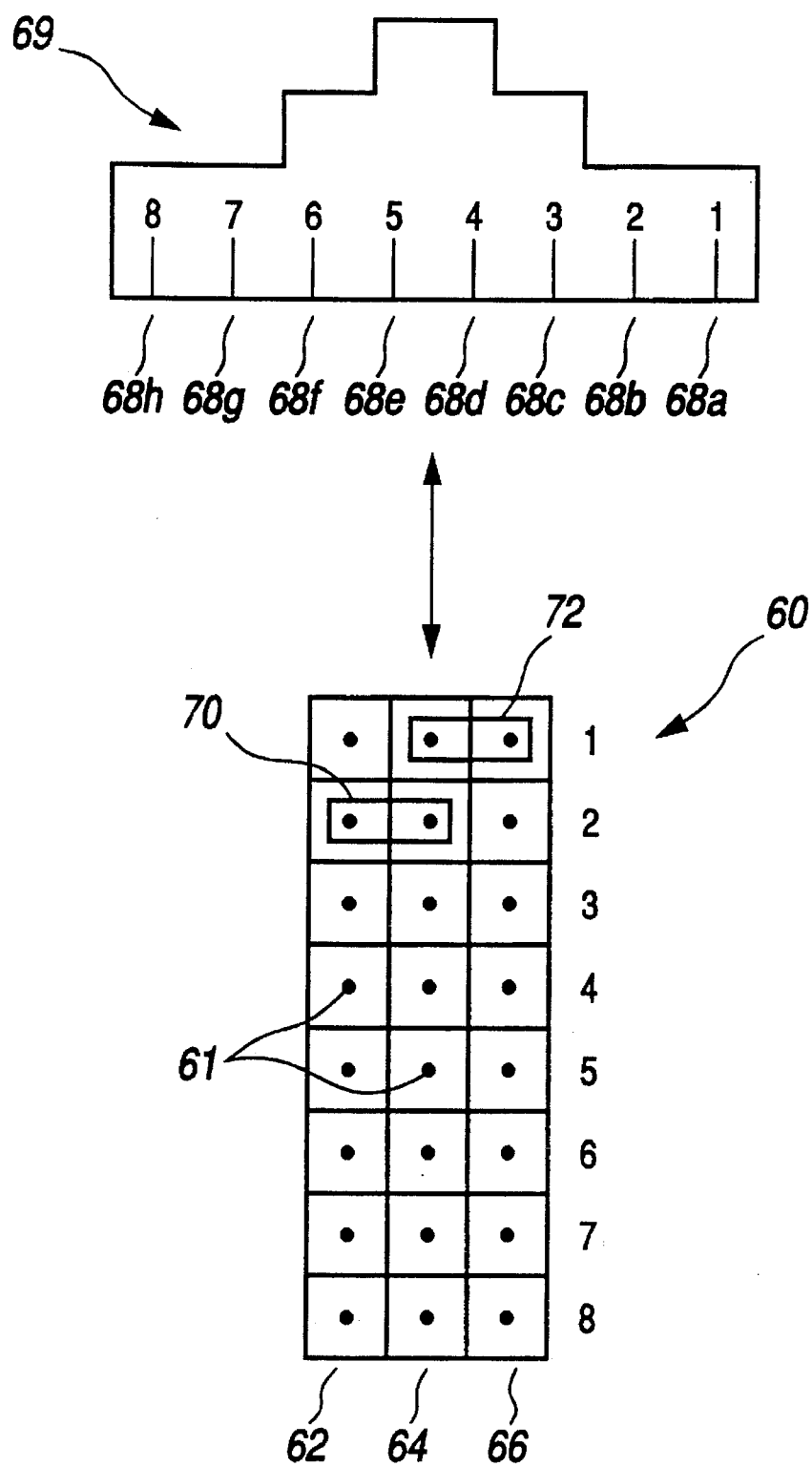
FIG. 6 is a representation of a connector interface according to the present invention.

A representation of a connector interface according to the present invention is depicted in FIG. 6. Those of ordinary skill in the field will appreciate that the invention may be practiced using connectors having any number of pins or any physical configuration.

In one embodiment, depicted in FIG. 6, the invented interface device is seen as a three by eight header block 60 having twenty-four pins 61. The pins 61 of the header block 60 are divided into three columns comprising a tip column 62, a connector column 64, and a ring column 66. Pins one through eight 68a–68h of a cable connector 69, here shown as an RJ45 connector, are connected to pins one through eight, respectively, of the connector column 64. All eight pins of the tip column 62 are connected together to form a tip wire bus. The tip wire bus connects to the tip signal receiver of the attached computer device. Likewise, all eight pins of the ring column 66 are connected together to form a ring wire bus. The ring wire bus connects to the ring signal receiver of the attached computer device. A jumper 70 is then used to connect the pin of the connector column 64 that is wired to the tip wire to a pin in the tip column 62. A second jumper 72 is likewise used to connect the ring wire to the ring column 66. The jumper configuration of FIG. 6 corresponds to the AT&T pin configuration standard for an RJ45 connector according to which the tip wire is connected to pin 2 and the ring wire is connected to pin 1.

By using an invented interface device at each port of a multi-port networking hub such as the one depicted in FIG. 2, a user may easily configure each port to any possible active pin configuration (current standard configuration or future standards), at any given polarity.

Furthermore, if the invented interface device is combined with the invented automatic polarity correction device, the issue of wiring polarity becomes transparent to the user. The user need only identify the active pins for a given pin configuration standard, connect one of those pins to the tip column 62 and the other to the ring column 66. The user need not be concerned as to which active pin corresponds to the tip wire and which active pin corresponds to the ring wire because the automatic polarity correction device will ensure proper polarity.

While the present invention has been described with reference to one or more particular embodiments, those skilled in the art will recognize that many changes may be made thereto without departing from the spirit and scope of the present invention, which is set forth in the following claims.

We claim:

1. A computer-implemented method for correcting polarity in connections between computer devices, one of said computer devices generating a data signal comprising a synchronizing sequence, another of said computer devices receiving said data signal, said method comprising the steps of:

(a) scanning, under control of said receiving computer device, said data signal for said synchronizing sequence for a predetermined amount of time;

(b) inverting, under control of said receiving computer device, the polarity of said data signal if said synchronizing sequence is not detected within said predetermined amount of time; and (c) repeating steps (a) and (b).

2. The method of claim 1 further comprising the steps of:

(a) starting a timer set to expire after said predetermined amount of time;

(b) clearing a valid polarity latch in response to said step of starting a timer;

(c) setting the valid polarity latch, during said latching step, if said synchronizing sequence is detected by said step of scanning;

(d) determining, upon the expiration of said timer, whether said polarity latch has been set; and (e) said step of inverting the polarity of the data signal occurs if said step of determining whether said polarity latch has been set indicates that said synchronizing sequence has not been detected.

3. A method for correcting polarity in connections between computer devices, one of said computer devices generating a data signal comprising a synchronizing sequence, another of said computer devices receiving said data signal, said method comprising the steps of:

(a) clearing a valid polarity latch responsive to a timer;

(b) starting said timer, said timer being set to expire after a predetermined amount of time;

(c) scanning a data signal for said synchronizing sequence;

(d) setting the valid polarity latch if said synchronizing sequence is detected during said step of scanning a data signal;

(e) repeating said steps (c) and (d) until the timer expires;

(f) inverting the polarity of the data signal if the valid polarity latch is not set by the time said timer expires; and (g) repeating steps (a)–(f).

4. An apparatus for correcting polarity in connections between computer devices, one of said computer devices generating a data signal comprising a synchronizing sequence, another of said computer devices receiving said data signal, said received data signal being an incoming data signal, said receiving computer comprising:

(a) a detector for scanning said incoming data signal for said synchronizing sequence for a predetermined amount of time, said detector repeatedly scanning said incoming data signal for said synchronizing sequence in increments of said predetermined amount of time; and (b) an invertor for inverting the polarity of the incoming data signal if said synchronizing sequence is not detected within one of said increments of said predetermined amount of time.

5. The apparatus of claim 4 further comprising an invertor for inverting the polarity of an outgoing data signal if said incoming data signal has been inverted.

6. The apparatus of claim 4 further comprising a current polarity latch the state of which determines whether said invertor will invert the polarity of said incoming data signal, the state of said polarity latch being indicative of whether said synchronizing sequence was detected within an increment of said predetermined amount of time.

7. An improved connector system for interfacing between a first computer device and a second computer device which provides for compatibility of connector pin configuration and signal polarity, said first computer device having a communication port with a pin configuration defined by a first predetermined standard and said second computer device having a communication port with a pin configuration defined by a second predetermined standard, one of said computer devices generating a data signal comprising a synchronizing sequence, the other of said computer devices receiving said data signal, comprising:

(a) a cable having a first end and a second end and having a first wire and a second wire for carrying communication signals between said first computer device and said second computer device, said cable having a first connector at said first end for receiving said first wire and said second wire, said first connector being adapted to engage said communication port of said first computer device, said first wire and said second wire being disposed in said first connector at pin locations defined by said first predetermined standard, said cable having a second connector at said second end, said second connector having a first pin for making electrical contact with said first wire and a second pin for making electrical contact with said second wire, said first pin and said second pin being disposed in said second connector at locations defined by said first predetermined standard;

(b) a header block adapted to receive said second connector and to interface with said communication port of said second computer device, said header block having a first wire bus adapted to make electrical contact with a first wire pin in said communication port of said second computer device and a second wire bus adapted to make electrical contact with a second wire pin in said communication port of said second computer device;

(c) a first jumper for connecting said first pin to said first wire bus;

(d) a second jumper for connecting said second pin to said second wire bus;

(e) a detector for scanning said data signal received via said cable by said receiving computer device for said synchronizing sequence for a predetermined amount of time, said detector repeatedly scanning said data signal for said synchronizing sequence in increments of said predetermined amount of time; and (f) an invertor for inverting the polarity of said data signal received if said synchronizing sequence is not detected within one of said increments of said predetermined amount of time.

8. The method of claim 1 further comprising the step of:

latching, under control of said receiving computer device, the polarity of said data signal if said synchronizing sequence is detected within said predetermined amount of time, said step of latching occurring after said step of scanning and before said step of repeating and wherein said step of repeating further comprises repeating said latching step.

9. The method of claim 8 further comprising the steps of:

(a) starting a timer set to expire after said predetermined amount of time;

(b) clearing a valid polarity latch in response to said step of starting a timer;

(c) setting the valid polarity latch, during said latching step, if said synchronizing sequence is detected by said step of scanning;

(d) determining, upon the expiration of said timer, whether said polarity latch has been set; and (e) said step of inverting the polarity of the data signal occurs if said step of determining whether said polarity latch has been set indicates that said synchronizing sequence has not been detected.

* * * * *